United States Patent
Ito et al.

(10) Patent No.: US 6,513,986 B2
(45) Date of Patent: Feb. 4, 2003

(54) ELECTRICAL PITTINGPROOF ROLLING BEARING

(75) Inventors: Kenji Ito, Mie (JP); Masaki Egami, Mie (JP)

(73) Assignee: NTN Corporation, Osaka (JP)

( * ) Notice: Subject to any disclaimer, the term of this patent is extended or adjusted under 35 U.S.C. 154(b) by 78 days.

(21) Appl. No.: 09/741,432

(22) Filed: Dec. 21, 2000

(65) Prior Publication Data

US 2001/0014545 A1 Aug. 16, 2001

(30) Foreign Application Priority Data

Dec. 24, 1999 (JP) .......................... 11-365796
Sep. 21, 2000 (JP) ....................... 2000-287168

(51) Int. Cl.$^7$ ............................... F16C 19/26
(52) U.S. Cl. .................. 384/569; 384/476; 384/492
(58) Field of Search ................ 384/476, 492, 384/513, 569, 622

(56) References Cited

U.S. PATENT DOCUMENTS 5,375,933 A  * 12/1994 Mizutani et al. ............ 384/476
5,975,764 A  * 11/1999 Okada et al. ............... 384/476

* cited by examiner

*Primary Examiner*—Lenard A. Footland
(74) *Attorney, Agent, or Firm*—Wenderoth, Lind & Ponack, L.L.P.

(57) ABSTRACT

An electrical pittingproof rolling bearing having an insulating film is provided which is not creep-deformed under a bearing load even if used for a long time at high temperature and in which the bearing interference is stable with time under such severe use conditions. An insulating film formed on the surface of a bearing ring comprises a resin having a compression permanent strain of 2% or less under heating/pressurizing conditions in which a pressure of 20 MPa is applied for 24 hours at 120° C. Also, the insulating film is formed from a resin composition containing 30–80 vol % of a polyphenylene sulfide resin and 5–65 vol % of a polyamide-imide resin, and 5–50 vol % of insulating inorganic materials. Preferably, the insulating film is formed to cover at least one of the outer peripheral surface of the outer ring and the inner peripheral surface of the inner ring, and the side faces of at least one of the inner and outer rings.

8 Claims, 3 Drawing Sheets

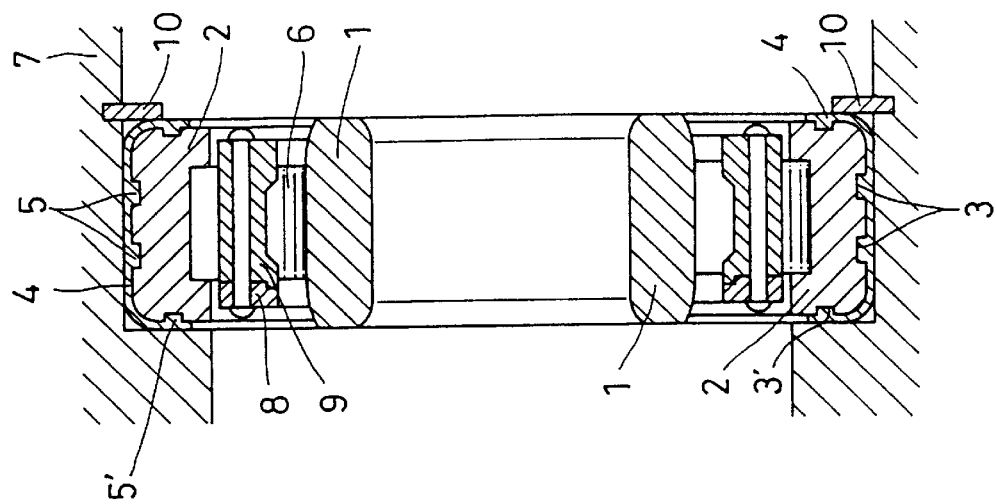
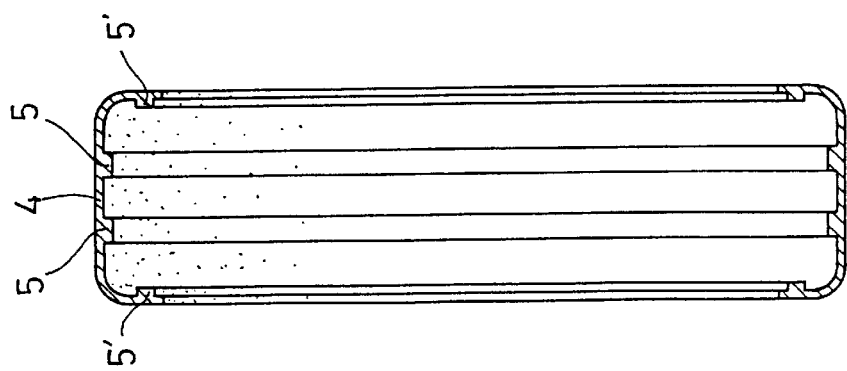

ELECTRICAL PITTINGPROOF ROLLING BEARING

BACKGROUND OF THE INVENTION

This invention relates to an electrical pittingproof rolling bearing having an insulating film on its bearing ring surface.

Heretofore, for rolling bearings such as ball bearings, in order to prevent electrolytic corrosion phenomena produced between the bearing rings and the rolling elements, an insulating film has been formed on a bearing ring surface to shut off current flowing into the bearing rings from outside (Japanese utility model publication 2-85016).

As electrical pittingproof rolling bearings having such an insulating film, one having a film of polyphenylene sulfide resin (hereinafter abbreviated as PPS) containing glass fiber is disclosed in Japanese patent publication 3-277818 and one using a thermoplastic resin such as polyamide resin or PPS as a covering material is disclosed in Japanese utility model publication 5-89953.

Since they have a film made of a resin having high insulating properties formed on the surfaces of their bearing rings, they have a stable electrical pittingproof function. Also, since the film is integrally formed on the bearing rings by injection molding, high moldability is achieved and the film can be formed on the bearing rings at a low cost.

But if such conventional electrical pittingproof rolling bearings are used at such a high temperature as over 100° C. for a long time, the insulating film might be creep-deformed under bearing loads. In other words, there is a problem that if they are used for a long time at high temperature, interference of the bearing decreases with time.

In mounting a bearing on a shaft or in a housing, the shaft on which rotary load acts is normally fixed by "tight fit". For such a "tight fit", it is necessary to give an interference to the fitting surface between the bearing ring and the shaft or housing.

Generally, a maximum interference is 1/1000 or under of the shaft diameter or the bearing outer diameter. If the interference decreases with time, relative movement occurs at the bearing fitting surface in radial, axial and rotational directions, so that undesirable problems such as wear of the fitting surfaces may arise.

Reducing the change of interference with time by forming the insulating film of a small thickness is theoretically possible. But it is not easy to form an insulating film of a resin having a thickness of e.g. 0.2 mm with a uniform thickness. This is because high melt-viscosity of the resin can cause insufficient filling of resin in a mold. In fact, if the thickness of the insulating film is 0.3 mm or less, it tends to crack, and forming it to a uniform thickness is difficult. Thus it was impossible to practically suppress change in the interference with time by thinning the insulating film.

As an example of electrical pittingproof rolling bearings used for a long time under large loads, as shown in FIG. 4, there are electrical pittingproof rolling bearings 12, 13 used with a motor 11 of an electric railroad car and its rotating force transmitting device. Rolling bearings applicable to such use are required.

Also, by adding glass fiber to PPS which is a material forming the insulating film, it is possible to improve the creep resistance of the insulating film. But it was impossible to sufficiently improve the creep resistance with the content of glass fiber sufficient to maintain injection moldabibity.

Also, since PPS is a resin having a glass transition point (Tg) at around 90° C., at a higher temperature than Tg of PPS, the durability of the bearing comprising a PPS composition worsens.

An object of this invention is to provide an electrical pittingproof rolling bearing which has a good creep resistance of the insulating film formed on the bearing ring surface, in which even under high-temperature, high-load conditions, the interference of the bearing is stable with time, and which rotates smoothly.

Another object of this invention is to provide an electrical pittingproof rolling bearing in which even if it is used at a high temperature for a long time over the glass transition point of PPS, its insulating film is not creep-deformed under bearing load, and the interference of the bearing is stable with time, and which rotates smoothly.

It is also an object of this invention to provide an electrical pittingproof rolling bearing which can be used for a long time under large load and which can be used with a device for transmitting a rotating force from a motor of an electric railroad car.

SUMMARY OF THE INVENTION

In order to provide an electrical pittingproof rolling bearing in which the bearing interference is stable with time, according to this invention, there is provided an electrical pittingproof rolling bearing having bearing rings, the rolling bearing having an insulating film on the surface of the bearing ring, characterized in that the insulating film comprises a resin having a compressive permanent strain of 2% or less under heating/pressurizing conditions in which a pressure of 20 MPa is applied for 24 hours at 120° C.

By forming the insulating film from a resin having a permanent compression strain of 2% or less under predetermined heating/pressurizing conditions, an electrical pittingproof rolling bearing is provided in which the interference of the bearing is sufficiently stable with time. Thus, even if it is repeatedly exposed to high temperatures, the size of the gap between the outer peripheral surface and the housing would not change, and tightening bolts for a ring for preventing the bearing from getting out would not loosen, so that the interference of the bearing is stable with time. A smoothly rotating electrical pittingproof bearing is thus provided.

Conversely, if the insulating film is formed from a resin having a permanent compression strain of over 2%, it may be necessary to rather thickly form the insulating film, or rattling may occur due to change in the interference of the bearing, so that wear tends to develop on the fitting surface.

Also, with an electrical pittingproof rolling bearing having an insulating film on a bearing ring surface, in order to solve the problem that the insulating film of a PPS resin deforms if it is used for a long time at a high temperature over the glass transition point of PPS resin, according to this invention, the insulating film is formed from a resin composition containing 30–80 vol % of polyphenylene sulfide resin (PPS) and 5–65 vol % of polyamide-imide resin.

A rolling bearing having an insulating film formed from a resin composition to which are added PPS and a polyamide-imide resin is superior in creep resistance particularly at high temperature to a conventional PPS-base insulating film. Thus an electrical pittingproof rolling bearing is provided in which the interference of the bearing is sufficiently stable with time.

With a rolling bearing having an insulating film formed from a resin composition to which is added a polyamide-imide resin by a predetermined amount, the resin composition has an injection-moldable fluidity in a molten state. Thus it is possible to mold an insulating film on a required portion of the bearing. Efficient manufacturing is thus possible.

According to the present invention, there is also provided an electrical pittingproof rolling bearing having bearing rings, the rolling bearing having an insulating film on the surface of the bearing ring, characterized in that the insulating film is formed from a resin composition containing 30–80 vol % of a polyphenylene sulfide resin, 5–65 vol % of a polyamide-imide resin, and 5–50 vol % of insulating inorganic materials. An electrical pittingproof rolling bearing having an insulating film comprising a PPS resin composition to which is added 5–50 vol % of an insulating inorganic material is particularly superior in creep resistance at high temperature. Also, the interference of the bearing is sufficiently stable with time.

With the electrical pittingproof rolling bearing according to this invention, the insulating film is molded to cover at least one of the outer peripheral surface of the outer ring and the inner peripheral surface of the inner ring, and the side faces of at least one of the inner and outer rings.

If such an electrical pittingproof rolling bearing is used in a motor of an electric railroad car or a mechanism for transmitting its rotating force or in both of them, even if a current flows through the rotary shaft of the motor, it will not leak to rails or metal parts forming another turning force transmission mechanism. Thus an electrical pittingproof rolling bearing is provided which has a reliable electrical pittingproofness.

The electrical pittingproof rolling bearing according to the present invention is used in a motor of an electric railroad car or in its rotating force transmitting mechanism.

Other features and objects of the present invention will become apparent from the following description made with reference to the accompanying drawings, in which:

BRIEF DESCRIPTION OF THE DRAWINGS

FIG. 1 is a sectional view showing how a rolling bearing of an embodiment is mounted to a housing;

FIG. 2 is a sectional view of the insulating film covering the outer ring surface of the rolling bearing;

DETAILED DESCRIPTION OF THE PREFERRED EMBODIMENT

Figure 3:
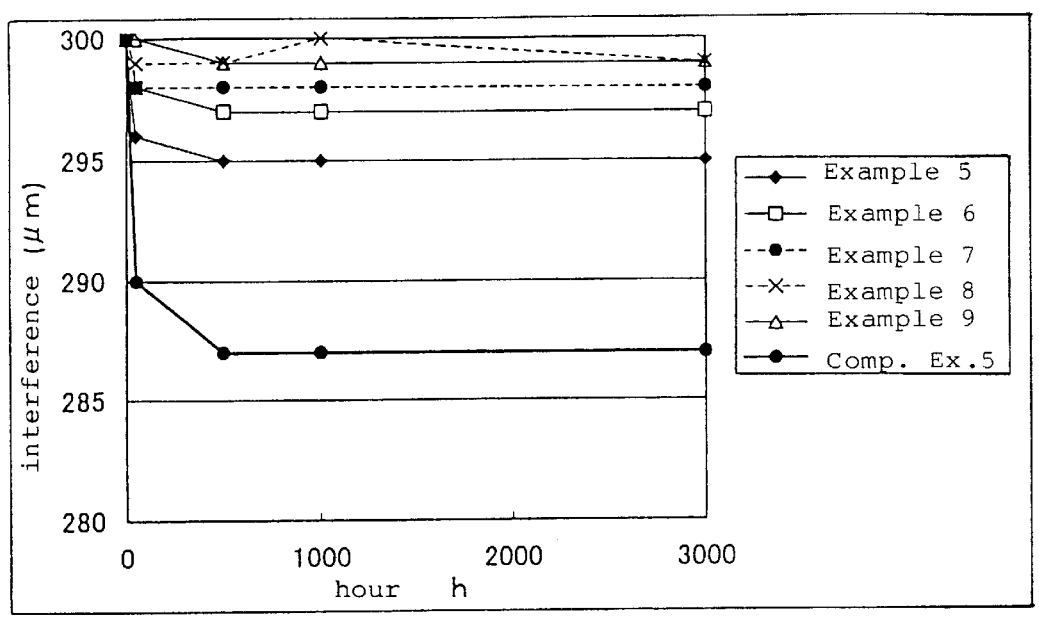
FIG. 3 is a graph showing the relation between the interference of the rolling bearings of Examples and Comparative Examples and the time for which they were let to stand at high temperature.

Embodiments are described below with reference to the drawings.

The embodiment shown in FIGS. 1 and 2 is an electrical pittingproof rolling bearing in which an insulating film 4 is formed by injection molding on a surface of bearing rings comprising an inner ring 1 and an outer ring 2. It is a cylindrical roller bearing in which on the surface (outer peripheral surface and side faces) of the outer ring 2, circumferential grooves 3 and 3' are formed by machining and an insulating film 4 of a uniform thickness is injection molded to cover the surface.

As shown in FIG. 2, the insulating film 4, which is a ring-like injection-molded member, has on its inner periph-ery ribs 5 or annular ribs 5' that are fitted in the circumferential grooves 3, 3' of the outer ring 2, respectively, to prevent displacement of the insulating film 4 in axial and radial directions. In FIG. 1, numeral 6 indicates "rollers" as the rolling elements, 7 a housing, 8 and 9 retainers, and 10 a ring for preventing the bearing from coming out.

The object on which the insulating film is to be formed may be one or both of the inner ring 1 and the outer ring 2. It is preferably formed to cover at least one of the outer peripheral surface of the outer ring and the inner peripheral surface of the inner ring, and the sides of at least one of the inner and outer rings. As for the kind of the bearing, it is applicable to any of a ball bearing, roller bearing, radial bearing and thrust bearing.

Figure 4:
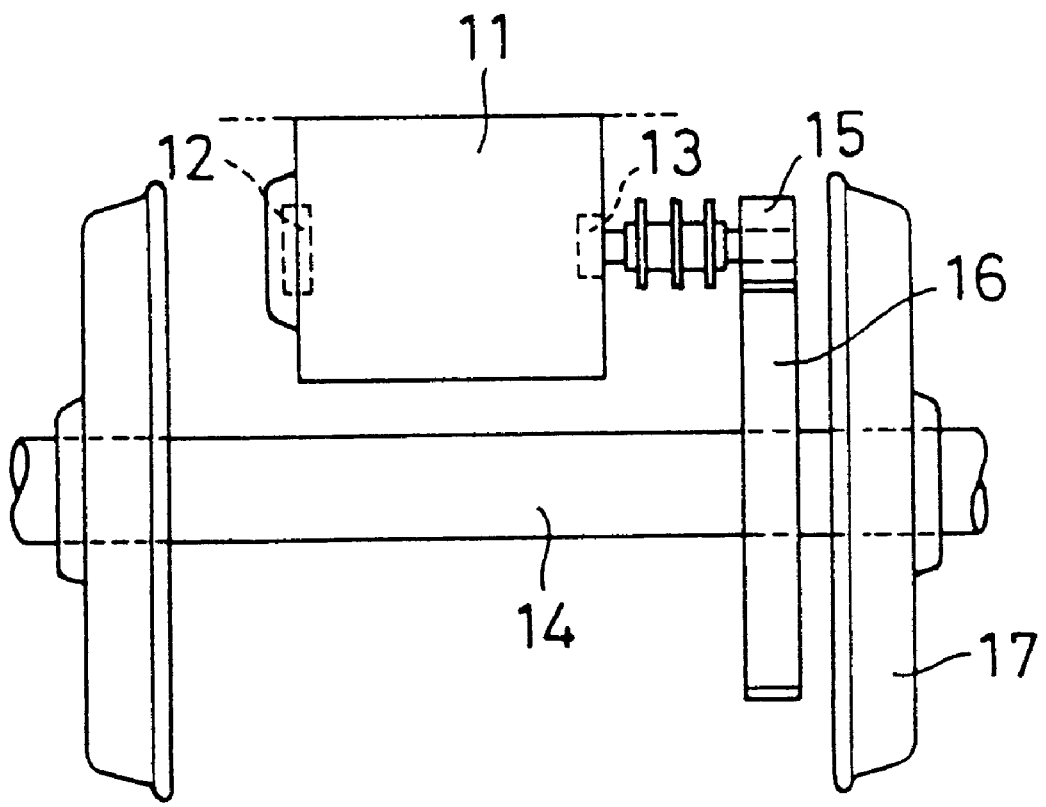
FIG. 4 is an explanatory view of a portion of an electric railroad car showing how the electrical pittingproof rolling bearing is used.

The electrical pittingproof rolling bearing provided with such an insulating film is used at required portions of a rotating force transmitting mechanism such as rolling bearings 12, 13 for supporting the rotary shaft of a motor 11 of an electric railroad car as shown in FIG. 4. Numeral 14 in FIG. 4 shows an axle, 15 and 16 gears, and 17 a wheel.

Description is made below of the heat-resistant resin material forming the insulating film of this invention. As will be described later, as the resin material forming the insulating film, besides PPS, polyamide-imide resin (hereinafter abbreviated as PAI), aromatic polyethers ketone resin, polycyanoether resin, thermoplastic polyimide resin, etc. may be used. The content thereof should be 30–80 vol % for the same reasons as with the below-described PPS.

The PPS used as the material forming the insulating film according to this invention is expressed by the following chemical formula 1.

Formula 1

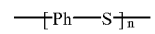

(Wherein -ph- is

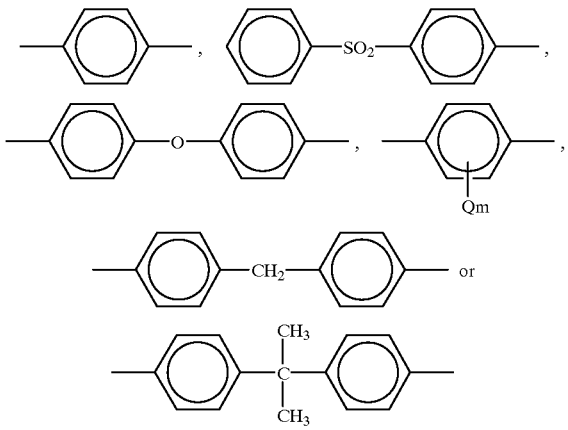

Q is a halogen such as F, Cl, Br or $CH_3$, and m is an integer of 1 to 4.)

An especially typical PPS is one expressed by the following chemical formula 2.

Formula 2

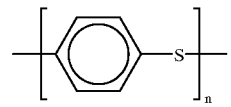

This resin is commercially sold under the trademark "RYTON" from Philips Petroleum in USA. Its manufacturing method is disclosed in U.S. Pat. No. 3,354,129. According the patent, it is manufactured by reacting p-dichlorobenzene with soda disulfide under pressurized conditions at 160–250° C. in N-methylpyrolidone as a solvent. Since it is possible to freely manufacture ones having various degrees of polymerization from ones having no cross-linking at all to ones having partial cross-linking by subjecting them to after-heat treatment steps, it is possible to arbitrarily select and use one having melt viscosity suitable for the solvent used. Also, the PPS used in this invention may be a straight-chain one not taking a cross-linked structure.

The content of the PPS forming the insulating film should be 30–80 vol %. If less than 30 vol %, it is difficult to make the most of the insulating properties and moldability inherent to PPS, and if added in a larger amount than 80 vol %, it is impossible to improve the creep resistance at high temperature by use of other components.

The polyamide-imide resin (hereinafter abbreviated as PAI) used in this invention is expressed by the chemical formula 3. The PAI used in this invention may be a copolymer with a compound containing other amide bonds.

Formula 3

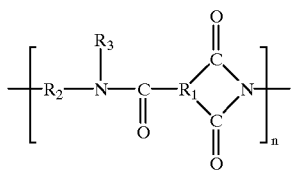

(Wherein $R_1$ represents a trivalent aromatic group containing at least one benzene ring, $R_2$ a bivalent organic group, and $R_3$ hydrogen, a methyl group or phenyl group.)

$R_1$ in chemical formula 3 is preferably one expressed by chemical formula 4.

Formula 4

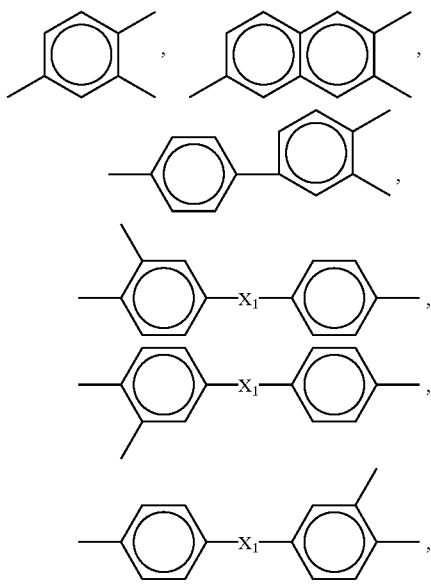

(Wherein $X_1$ is

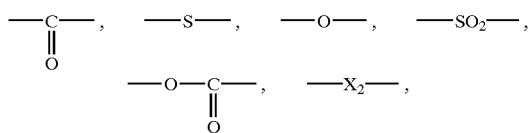

or $-O-X_2-$ and $X_2$ is a saturated aliphatic hydrocarbon group having one to six carbon atoms such as $-CH_2-$,

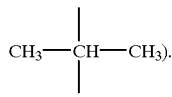

$R_2$ in chemical formula 3 may be $-(CH_2)m-$, wherein m is a saturated aliphatic hydrocarbon group having a carbon number of 4–12, or one expressed shown in the chemical formula 5.

Formula 5

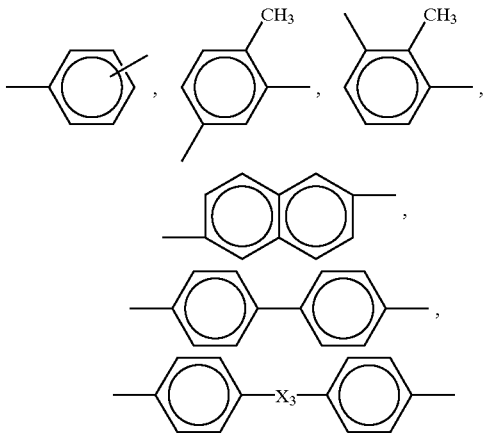

$X_3$ is $-O-$, $-S-$, $-SO_3-$, $-C_YH_{2Y}-$,

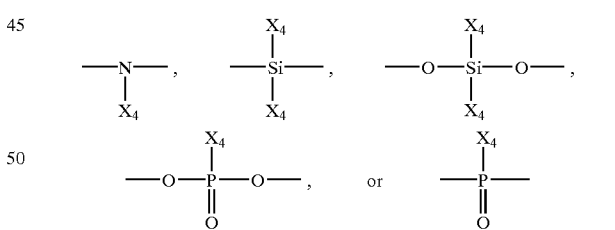

(In the general formulas of groups shown in Chemical Formula 5, Y is an integer of 1–3, $X_4$ is an aliphatic hydrocarbon group or an aromatic group having one to six carbon atoms.)

Also, it is preferable to copolymerize these PAI resins with units having the following structures because it improves compatibility with PPS and melt flowability.

Formula 6

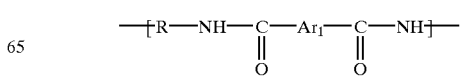

-continued

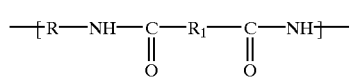
Formula 7

Ar1 in chemical formula 6 is a bivalent aliphatic group and as its specific examples, ones expressed in chemical formula 8 can be cited.

Formula 8

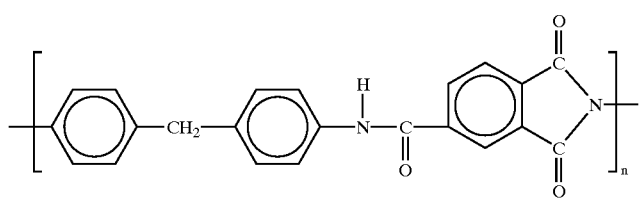

$R_1$ in chemical formula 7 is a divalent aliphatic group such as $—(CH_2)_m—$, more preferable one in which m=2–12, and particularly preferable one in which m=4–12.

The copolymer comprising the structure shown by chemical formula 3 and the structure shown by chemical formula 6 preferably comprises 10–70 mole % of the former and 90–30 mole % of the latter.

The copolymer comprising the structure shown by chemical formula 3 and the structure shown by chemical formula 7 preferably comprises 10–50 mole % of former and 90–50 mole % of the latter.

The copolymer comprising the structure shown by chemical formula 3, the structure shown by chemical formula 6, and the structure shown by chemical formula 7 preferably comprises 10–70 mole % of the first structure, 1–89 mole % of the second structure, and 1–70 mole % of the third structure. As for the arrangement of each structure in such copolymers, it may be any of random, block and alternating one.

The manufacturing method of such PAI is disclosed in U.S. Pat. No. 3,625,911. For example, an aromatic tricarboxylic anhydride expressed by the chemical formula 9 or its derivative and an organic diamine expressed by $H_2N—R_2—NH_2$, $OCN—R_2—NCO$ (wherein $R_2$ is the same as the one expressed by the chemical formula 3 or 4) or its derivative are reacted together in a polar organic solvent such as dimethylacetamide, dimethylformamide or N-methylpyrrolidone at a predetermined temperature for a predetermined time to produce a polyamide acid and the latter is converted to an imidized state by heating or any other method.

Formula 9

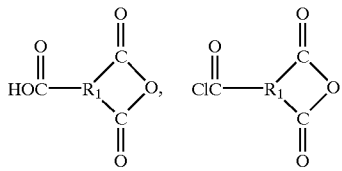

As PAI manufactured by this method, one expressed by the chemical formula 10 can be cited, and as its commercially available product, Torlon made by AMOCO Performance Products, Inc. in USA can be cited.

Formula 10

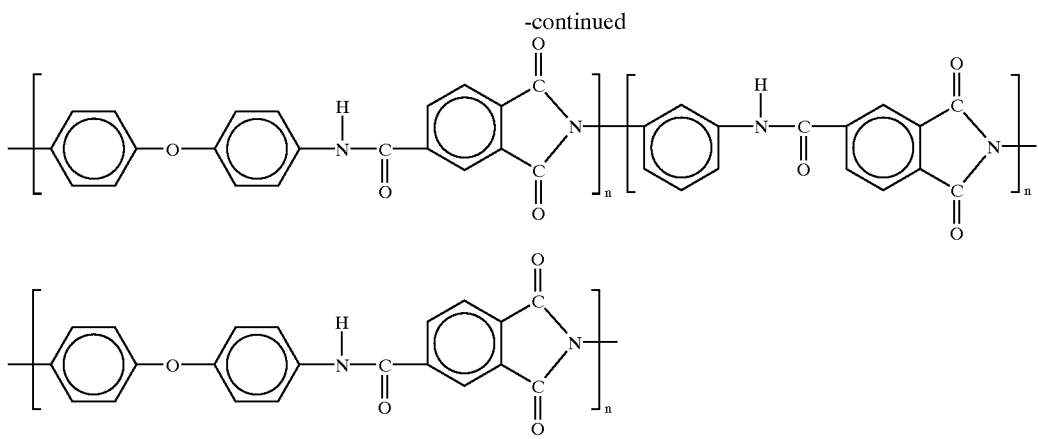

Since PAI obtained by the above method has poor melt flowability, in order to obtain PAI having improved flowability, it is preferable to manufacture it from an aromatic tricarboxylic anhydride and diisocyanate. Also, in polymerizing, it is preferable to carry out reactions under such conditions that amidation and imidation progress in a stepwise manner as disclosed in Japanese patent publication 6-322060.

Also, for the purpose of improving the compatibility of PAI and PPS, a precursor of a polyamide-IMIDE may be used or an isocyanate compound as a third component may be added.

The content of PAI forming the insulating film should be 5–65 vol %. If less than 5 vol %, it is impossible to sufficiently improve creep resistance at high temperature. If over 65 vol %, it would be difficult to make the most of the insulating properties and moldability of the PPS as another component, and flowability in a molten state lowers, so that injection molding becomes difficult.

Next, the aromatic polyether ketone resin (hereinafter abbreviated as PEK) used in this invention is a copolymer comprising one of repeating units expressed in the chemical formula 11 or a copolymer obtained by polymerizing a repeating unit expressed in chemical formula 11 with a repeating unit expressed in chemical formula 12 so as not to lose the properties inherent to PEK.

Formula 11

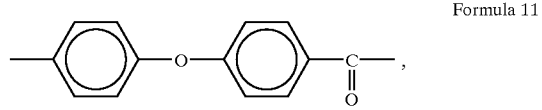

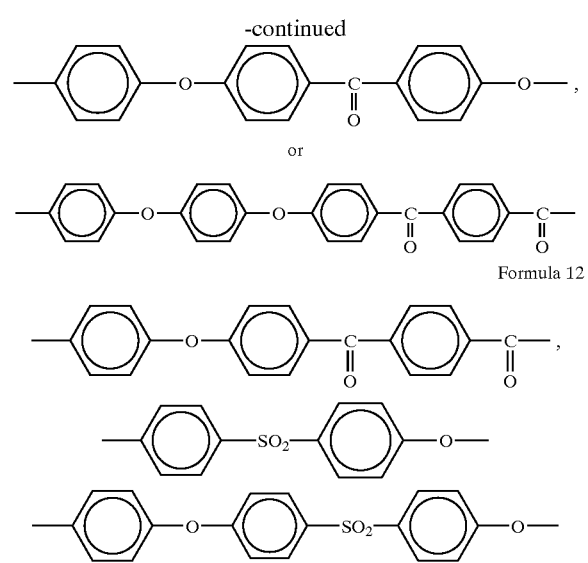

Formula 12

As commercially available products of PEK, PEEK (made by VICTREX) expressed by the chemical formula 13, PEK (made by VICTREX) expressed by the chemical formula 14, or Ultrapek (made by BASF) expressed by the chemical formula 15 can be cited. Besides such commercially available products, they can be manufactured by well-known method described e.g. in Japanese patent publication 54-90296.

Formula 13

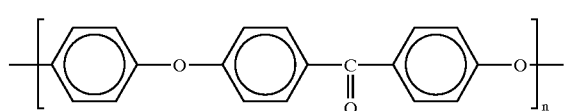

Formula 14

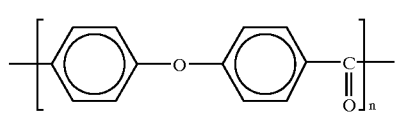

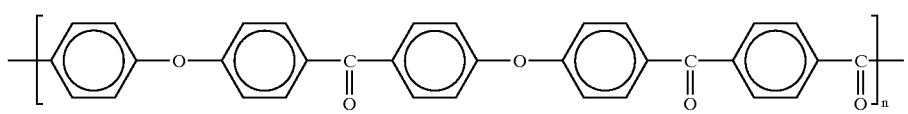

Formula 15

Next, the polycyanoarylether resin (hereinafter abbreviated as PEN) used in this invention is a polymer comprising a repeating unit expressed by the chemical formula 16 or a polymer in which repeating units expressed by the chemical formula 17 coexist in the ratio of about 20 mole % or under with repeating units expressed by the chemical formula 16 so as not to lose properties inherent to PEN.

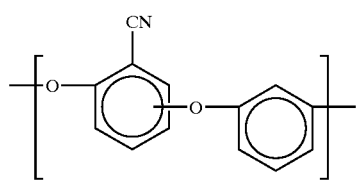

Formula 16

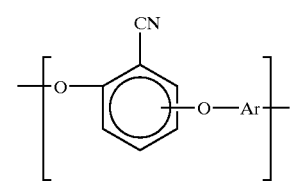

Formula 17

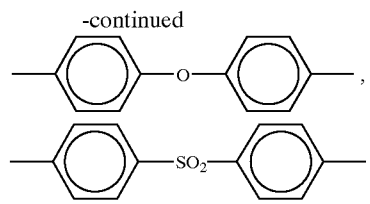

-continued

Such PEN is preferably one having a reduced viscosity ($\eta 7sp/C$) of 0.3 g/dl or over at 60° C. in a solution having a concentration of 0.2 g/dl with p-chlorophenol as a solvent. Such PEN's are commercially available from IDEMISTU KOSAN as polyethernitrile (ID 300). The manufacturing method of PEN is disclosed in Japanese patent publication 63-3059.

The thermoplastic polyimide resin used in this invention is a polymer having a repeating unit expressed by the chemical formula 18, and obtained by cyclodehydrating a polyamide acid obtained by using an ether diamine expressed by the chemical formula 19 as a diamine component, and reacting the diamine with one or more kind of tetracarboxylic dianhydride. Among them, an especially typical one of which $R_1$–$R_4$ are all hydrogen atoms is commercially available under the trademark "AURUM" from Mitsui Chemical. Its manufacturing method is disclosed in Japanese patent publications 61-143478, 62-68817, 62-86021, etc.

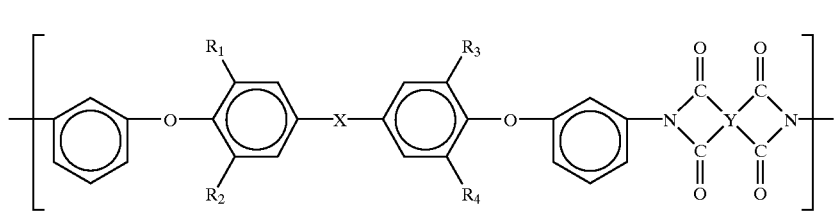

Formula 18

(Wherein Ar is an aryl group such as

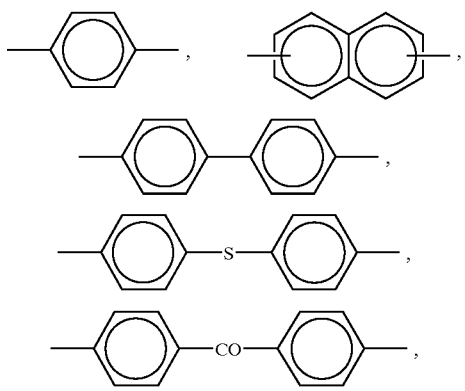

(In the formula, X represents a group selected from the group consisting of a direct bond, a hydrocarbon group having a carbon number of 1–10, a hexafluorinated isopropylidene group, a carbonyl group, a thio group and a sulfonic group, and $R_1$–$R_4$ represent hydrogen, a lower alkyl group having a carbon number of 1–5, a lower alkoxy group having a carbon number of 1–5, chloride or bromine, and they may be the same or different from one another. Y represents a quadrivalent group selected from the group consisting of an aliphatic group having a carbon number of 2 or over, a cycloaliphatic group, a monocyclic aromatic group and noncondensed polycyclic aromatic groups having aromatic groups coupled together directly or by a crosslinking member.)

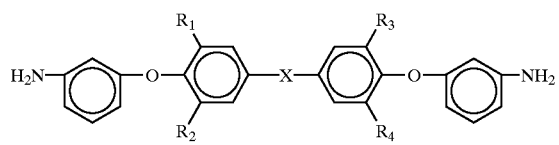

Formula 19

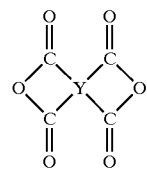

Formula 20

Since the thermoplastic polyimide resin shows thermoplasticity while maintaining heat resistance inherent to polyimide resin, it can be molded relatively easily by compression molding, injection molding, extrusion molding or other melt molding method.

Also as specific examples of the diamine expressed by the chemical formula 19, the following can be cited: bis[4-(3-aminophenoxy)phenyl]methane, 1,1-bis[4-(3-aminophenoxy)phenyl]ethane, 1,2-bis[4-(3-aminophenoxy)phenyl]ethane, 2,2-bis[4-(3-aminophenoxy)phenyl]propane, 2-[4-(3-aminophenoxy)phenyl]-2-[4-(3-aminophenoxy)-3-methylphenyl]propane, 2,2-bis[4-(3-aminophenoxy)-3-methylphenyl]propane, 2-[4-(3-aminophenoxy)phenyl]-2-[4-(3-aminophenoxy)-3,5-dimethylphenyl]propane, 2,2-bis[4-(3-aminophenoxy)-3,5-dimethylphenyl]propane, 2,2-bis[4-(3-aminophenoxy)phenyl]butane, 2,2-bis[4-(3-aminophenoxy)phenyl-1,1,1,3,3,3-hexafluoropropane, 4,4'-bis(3-aminophenoxy)biphenyl, 4,4'-bis(3-aminophenoxy)-3-methylbiphenyl, 4,4'-bis(3-aminophenoxy)-3,3'-dimethylphenyl, 4,4'-bis(3-aminophenoxy)-3,5-dimethylbiphenyl, 4,4'-bis(3-aminophenoxy)-3,3',5,5'tetramethylbiphenyl, bis[4-(3-aminophenoxy)phenyl] ketone, bis[4-(3-aminophenoxy)phenyl]sulfide, bis[4-(3-aminophenoxy)phenyl]sulfone, etc. can be cited. They may be used singly or two or more may be mixed.

Also, other diamines may be added by mixing within such a range as not to impare melt flowability of the thermoplastic polyimide resin. As dimethylamines usable, for example, m-aminobenzylamine, p-aminobenzylamine, 3,3'-diaminodiphenylether, 3,4'-diaminodiphenylether, 4,4'-diaminodiphenylether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 3,4'-diaminobenzophenone, 4,4'-diaminobenzophenone, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 2,2-bis[4-(4-aminophenoxy)phenyl]propane, 4,4'-bis(4-aminophenoxy) biphenyl, 4,4'-bis(4-aminophenoxy)ketone, bis[4-(4-aminophenoxy)phenyl]sulfide, and bis[4-(4-aminophenoxy) phenyl]sulfone can be cited. These diamines can be used by mixing at the rate of 30% or under and preferably 5% or under.

The thermoplastic polyimide resin especially preferably used in this invention is obtained by reacting the abovesaid diamine with a tetracarboxylic dianhydride in an organic soluent and cyclodehydrating. The latter is a tetracarboxylic dianhydride expressed by the chemical formula 20 (wherein Y is the same as Y in the chemical formula 2).

As specific compounds of the tetracarboxylic dianhydride expressed by the chemical formula 20, the following can be named; ethylene tetracarboxylic dianhydride, 1,2,3,4-butanetetracarboxylic dianhydride, cyclopentanecarboxylic dianhydride, pyromellitic dianhydride, 3,3', 4,4'-benzophenonetetracarboxylic acid dianhydride, 2,2', 3,3'-benzophenonetetracarboxylic acid dianhydride, 3,3', 4,4'-biphenyltetracarboxylic acid dianhydride, 2,2', 3,3'-biphenyltetracarboxylic acid dianhydride, bis(3,4-dicarboxyphenyl)ether dianhydride, bis(3,4-dicarboxyphenyl)sulfone dianhydride, 1,1-bis(2'p-dicarboxyphenyl)ethane dianhydride, bis(2,3-dicarboxyphenyl)methane dianhydride, bis(3,4-dicarboxyphenyl)methane dianhydride, 2,3,6,7-naphthalenetetracarboxylic acid dianhydride, 1,4,5,8-naphthalenetetracarboxylic acid dianhydride, 1,2,5,6-naphthalenetetracarboxylic acid dianhydride, 1,2,3,4-benzenetetracarboxylic acid dianhydride, 3,4,9,10-perylene tetracarboxylic acid dianhydride, 2,3,6,7-anthracenetetracarboxylic acid dianhydride, 1,2,7,8-phenanthrenetetracarboxylic acid dianhydride, 4,4'-(p-phenylenedioxy)diphthalic acid dianhydride, and 4,4'-(m-phenylenedioxy)diphthalic acid dianhydride. These tetracarboxylic acid dianhydrides may be used singly or two or more in combination.

The insulating inorganic material used in this invention is added to reliably improve the creep resistance at high temperature while maintaining insulating properties of the resin composition of which the main component is a heat-resistant resin. As preferable insulating inorganic materials, the following can be cited. They may be added two or more in combination and may be ones that have been subjected to surface treatment.

Specific examples of the insulating inorganic materials used in this invention are glass fiber, calcium oxide, clay, calcined clay, silica, glass balls, aramide fiber, alumina, magnesium oxide, calcium silicate, asbestos, sodium aluminate, sodium aluminosilicate, magnesium silicate, aluminum hydroxide, calcium hydroxide, barium sulfate, potassium alum, sodium alum, iron alum, shirasu balloons, glass balloons, zinc oxide, zinc oxide whiskers, antimony trioxide, boric acid, borax, zinc borate, titanium oxide, titanium oxide whiskers, glass beads, calcium carbonate, calcium carbonate whiskers, zinc carbonate, hydrotalcite, iron oxide, potassium titanate, potassium titanate whiskers, aluminum borate, aluminum borate whiskers, aluminum oxide and aluminum nitride.

Insulating inorganic materials as shown above, if in fibrous form, preferably have a fiber diameter of about 0.1–20 $\mu$m and a fiber length of 20–3000 $\mu$m. If in particle form, favorable results were obtained by using those having a particle diameter of about 1–100 $\mu$m.

In blending such an insulating inorganic material, in order to disperse heat build-up from the bearing, one having a good heat conductivity such as aluminum oxide or aluminum nitride may be selected. Also, in order to reduce the current value under an alternating voltage, a material low in dielectric constant may be selected.

The content of the insulating inorganic material forming the insulating film should be 5–50 vol %. If less than 5 vol %, it is impossible to sufficiently improve the creep resistance at high temperature. If over 50 vol %, it is impossible to make the most of the insulating properties and ease of molding of PPS, and also difficult to carry out injection molding due to decrease in flowability in a molten state.

The method of mixing raw materials of the resin composition of this invention is not specifically limited and any ordinary method can be used. For example, resins as major components and other materials may be dry-mixed one after another or all at once by a mixer such as a Henschel mixer, ball mill or tumbler mixer, and then the mixture may be supplied to an injection molder or a melt-extruding molder which has a good melt mixing properties or melt-mixed beforehand by use of a heat roll, kneader, Banbury mixer or melt extruder. Also, after PPS and PAI have been melt-mixed beforehand, other components may be added and further melt-mixed.

Further, for the molding of the resin composition of this invention, in view of the manufacturing efficiency, it is preferable employ injection molding. But any other known molding method may be employed. That is to say, a well-known synthetic resin molding method such as compression molding or extrusion molding may be employed. After the composition has been melt-mixed, it may be pulverized by use of a jet mill or a refrigerating pulverizer to classify them into a desired particle diameter. Or without classifying, fluidized dip coating or electrostatic powder coating may be carried out. Also, spray coating or dip coating may be employed by dispersing the powder obtained in a solvent.

EXAMPLES

The raw materials used in the Examples and Comparative Examples are as follows. Numbers shown in brackets coincide with the numbers used in the following Tables, and the contents of the components are all in volume percent.

(1) polyamide-imide resin [PAI①]
(polyamide-imide resin obtained by polymerizing in N-methylpyrrolidone 18 mole % of trimellitic anhydride, 32 mole % of isophthalic acid, 50 mole % of 2,4-tolylene diisocyanate as raw materials as raw materials) by firstly amidizing and then imidizing.
(2) polyamide-imide resin [PAI②](polyamide-imide resin obtained by polymerizing in N-methylpyrrolidone 50 mole % of trimellitic anhydride, and 50 mole % of 2,4-tolylene diisocyanate as raw materials) by firstly amidizing and then imidizing.
(3) polyphenylene sulfide resin [PPS①]
(semi-linear type PPS T2 made by TOHPREN)
(4) polyphenylene sulfide resin [PPS②]
(linear type PPS LR-03 made by TOHPREN)
(5) polyphenylene sulfide resin [PPS③]
(T4AG made by TOHPREN)
(6) glass fiber [GF]
(chopped strand 03MA497 made by ASAHI Fiber Glass)
(7) glass beads [GB]
(EGB731APN made by TOSHIBA BALOTINI)
(8) aluminum nitride powder [AlN]
(AlN-7 made by KYORITSU YOGYO)

Examples 1–4

As shown in FIGS. 1 and 2, Examples were cylindrical roller bearings (outer diameter 170 mm, inner diameter 95 mm, width 32 mm) which had an inner ring 1 and an outer ring 2 of a standard type bearing. Circumferential grooves 3 were formed by machining on the surface of the outer ring 2 of NU214, and an insulating film 4 with a uniform thickness (1 mm) was molded on the surface formed with the grooves 3. The insulating films 4 were formed by mixing the materials shown in Table 1 all at once and injection molding the mixture.

As shown in FIG. 2, the insulating film 4, which is a ring-like molded member, has on its inner periphery ribs 5 which can be fitted in the circumferential grooves 3 of the outer ring 2 and annular ribs 5' that can be fitted in circumferential grooves 3' of the outer ring 2. By fitting them together, it is possible to prevent the insulating films 4 from shifting.

To form the insulating film 4 and the below-described test pieces for measuring permanent compression strain, the raw materials were mixed at the rates (vol %) shown in Table 1 in a Henschel mixer. The mixture was supplied to a twin-screw melt extruder and extruded at a cylinder temperature: 280–340° C. and a number of revolutions: 100 rpm to pelletize it, and the pellets obtained were injection molded at a resin temperature: 280–340° C., an injection pressure: 800 kgf/cm$^2$ and a mold temperature: 140° C. Using the insulating film, the bearing shown in FIG. 1 was manufactured, and the following tests were conducted.

<Measurement Test of Compression Permanent Strain>

As test pieces for measuring compression permanent strain, JIS1 dumbbells were injection-molded and 4 mm-square cubic test pieces were cut out by cutting. And opposed two surfaces parallel to the flow direction of resin during injection molding were clamped by two flat plate jigs made of stainless steel and pressurized to apply a pressure of 20 MPa to the test pieces. In this state, they were heated to 120° C. and after it had been let to stand for 24 hours, they were cooled to normal temperature and pressure was released. Immediately after pressure release, the thickness (B, mm) of the test piece in the pressurizing direction was measured, and permanent compression strain was determined also from the thicknesses (A, mm) before the test and based on the following formula.

$$\text{Permanent compression strain } (\%) = (A-B)/A \times 100$$

<Creep Resistance (Amount of Change in the Outer Diameter) of Bearings Under High-temperature Conditions>

The amount (in μm) of change in the outer diameter was measured after the bearings (100° C.) of the embodiment shown in FIG. 1 with an interference of 0.3 mm had been let to stand for 100 hours at 100° C. and they had been returned to normal temperature. The results are also shown in Table 1.

Comparative Examples 1–4

Except that the insulating films were formed with the compositions shown in Table 2, bearings shown in FIGS. 1 and 2 were manufactured in exactly the same manner as in the Examples and the compression permanent strain and creep resistance were measured under the same conditions as in Examples. The results are shown in Table 2.

As will be apparent from the results of Tables 1 and 2, it is apparent that for Comparative Examples 1–4, in which an insulating film comprising a resin whose compression permanent strain exceeded 2% when a pressure of 20 MPa was applied for 24 hours at 120° C., the interference increased with lapse of time for which they were left at high temperature. This shows that they have insulating films that are insufficient in creep resistance.

In contrast, Examples 1–4, which satisfied the predetermined conditions of compression permanent strain, were clearly advantageous in injection moldability and after 100 hours, they were superior in creep resistance to Comparative Examples.

Examples 5–9

Insulating films 4 were formed by adding the raw materials at the rates (vol %) shown in Table 3, mixing them in a Henshell mixer , supplying the mixture to a twin-screw melt extruder, extruding it under melt/mixing conditions (cylinder temperature: 280–340° C. and number of revolutions: 100 rpm) to pelletize it, and injection molding the pellets obtained at a resin temperature of 280–350° C., injection pressure of 800 kgf/cm² and mold temperature of 100–160° C. For ease of injection molding, the results were evaluated in two stages and are shown in the Table using symbols o for good and x for no good.

Also, in order to evaluate the creep resistance at high temperature, the bearings shown in FIG. 1 were manufactured using insulating films, and the bearings (interference at 120° C.: 0.3 mm) were let to stand for 3000 hours at 120° C. to measure changes in the interference with time. The results are shown in FIG. 3.

Comparative Examples 5–11

Except that the insulating films were formed with the compositions shown in Table 4, the bearings shown in FIG. 1 were manufactured in exactly the same manner as in Examples, and moldability was examined under the same conditions as in Examples. The results are shown in Table 4. For Comparative Examples 6, 9 and 11, flowability during melting was so bad that it was impossible to form insulating layers.

For Comparative Example 5, change in interference with time was measured under exactly the same conditions as in the evaluation method for creep resistance at high temperature in Examples, and the results are shown in the graph of FIG. 3.

As will be apparent from Tables 3 and 4 and FIG. 3, for Comparative Example 5 in which an insulating film comprising a resin composition not containing PAI was provided, with lapse of time for which it was let to stand at high temperature, the interference decreased markedly, and the creep resistance was insufficient. Also, for Comparative Examples 5–11 in which the contents of PPS, PAI and insulating inorganic materials were out of the predetermined ranges, neither of the injection moldability and the creep resistance were satisfactory.

In contrast, Examples 5–9 which met the predetermined contents, were clearly advantageous in that the injection moldability was good and after 3000 hours, they were superior in the creep resistance to Comparative Examples.

As has been described above, with the electrical pittingproof rolling bearing provided with an insulating film comprising a resin whose compression permanent strain was 2% or less when a pressure of 20 MPa was applied for 24 hours at 120° C., the insulating film formed on the surface of the bearing ring was good in creep resistance and the interference was stable with time over a long time even under high-temperature, high-load conditions. Thus, an electrical pittingproof rolling bearing is provided which smoothly rotates.

With the electrical pittingproof rolling bearing in which the insulating film was formed from a resin composition to which were added PPS and polyamide-imide resin, the insulating film is not creep-deformed even when subjected to a bearing load at high temperature for a long time. An electrical pittingproof rolling bearing is provided in which the interference is stable with time under such use conditions.

The rolling bearing with an insulating film formed from a resin composition to which a polyamide-imide resin is added by a predetermined amount has an injection-moldable flowability in a molten state and ease of molding.

The electrical pittingproof rolling bearing having an insulating film comprising a resin composition to which are added 5–50 vol % of insulating inorganic materials besides the above materials is extremely superior in creep resistance at high temperature. Thus an electrical pittingproof rolling bearing is provided in which the interference is extremely stable with time.

The electrical pittingproof rolling bearing having such advantages can be used with a mechanism for transmitting a rotating force from a motor of an electric railroad car, particularly as a bearing for supporting a rotary shaft of a main motor of an electric locomotive which is used for a long time especially under such conditions that electrical pitting tends to occur and a large load is applied.

TABLE 1

| | Examples | | | |
|---|---|---|---|---|
| | 1 | 2 | 3 | 4 |
| (1) PAI ① | — | — | — | 30 |
| (3) PPS ① | 65 | — | — | — |
| (4) PPS ② | — | 50 | 60 | 45 |
| (6) GF | 35 | 25 | 20 | 25 |
| (7) GB | — | 25 | — | — |
| (8) Aluminum nitride | — | — | 20 | — |
| Compression permanent strain (%) | 2 | 1.7 | 1.7 | 1.3 |
| *Creep resistance (μm) | 3 | 2 | 2 | 0 |

*Creep resistance is a change in outer diameter.

TABLE 2

| | Comparative Examples | | | |
|---|---|---|---|---|
| | 1 | 2 | 3 | 4 |
| (1) PAI ① | — | — | — | 35 |
| (3) PPS ① | 80 | 75 | 70 | — |
| (4) PPS ② | — | — | — | 55 |
| (6) GF | 20 | 25 | 25 | 10 |
| (7) GB | — | — | 5 | — |
| (8) Aluminum nitride | — | — | — | — |
| Compression permanent strain (%) | 3.5 | 2.6 | 2.4 | 2.2 |
| *Creep resistance (μm) | 18 | 14 | 10 | 10 |

*Creep resistance is a change in outer diameter.

TABLE 3

| | Examples | | | | |
|---|---|---|---|---|---|
| | 5 | 6 | 7 | 8 | 9 |
| (2) PAI ② | — | — | 30 | — | — |
| (1) PAI ① | 10 | 30 | — | 45 | 30 |
| (5) PPS ① | 75 | 45 | 45 | 30 | 40 |
| (6) GF | 15 | 25 | 25 | 25 | 30 |
| Moldability | ○ | ○ | ○ | ○ | ○ |
| Creep resistance | ○ | ○ | ○ | ○ | ○ |

TABLE 4

|  | Comparative Examples | | | | | | |
| --- | --- | --- | --- | --- | --- | --- | --- |
|  | 5 | 6 | 7 | 8 | 9 | 10 | 11 |
| (2) PAI② | — | 60 | — | — | — | — | — |
| (1) PAI① | — | — | — | 3 | 70 | 12 | 5 |
| (5) PPS① | 75 | 25 | 85 | 82 | 15 | 75 | 40 |
| (6) GF | 25 | 15 | 15 | 15 | 15 | 3 | 55 |
| Moldability | ○ | X | ○ | ○ | X | ○ | X |
| Creep resistance | — | ○ | X | X | ○ | X | ○ |

What is claimed is:

1. An electrical pittingproof rolling bearing having bearing rings, said rolling bearing having an insulating film on a surface of said bearing rings, said insulating film comprising a resin having a compressive permanent strain of 2% or less under heating/pressurizing conditions in which a pressure of 20 MPa is applied for 24 hours at 120° C., and said rolling bearing being used in a motor of an electric railroad car or in its rotating force transmitting mechanism.

2. The electrical pittingproof rolling bearing as claimed in claim 1 wherein said bearing rings comprise an outer ring and an inner ring, said insulating film is formed to cover at least one of an outer peripheral surface of said outer ring and an inner peripheral surface of said inner ring, and side faces of at least one of said inner and outer rings.

3. An electrical pittingproof rolling bearing having bearing rings, said rolling bearing having an insulating film on a surface of said bearing rings, said insulating film being formed from a resin composition containing 30–80 vol % of a polyphenylene sulfide resin, 5–65 vol % of a polyamide-imide resin, and 5–50 vol % of insulating inorganic materials.

4. The electrical pittingproof rolling bearing as claimed in claim 3 wherein said bearing rings comprise an outer ring and an inner ring, said insulating film is formed to cover at least one of an outer peripheral surface of said outer ring and an inner peripheral surface of said inner ring, and side faces of at least one of said inner and outer rings.

5. The electrical pittingproof rolling bearing as claimed in claim 3 wherein it is used in a motor of an electric railroad car or in its rotating force transmitting mechanism.

6. An electrical pittingproof rolling bearing having bearing rings, said rolling bearing having an insulating film on a surface of said bearing rings, said insulating film being formed from a resin composition containing 30–80 vol % of a polyphenylene sulfide resin and 5–65 vol % of a polyamide-imide resin.

7. The electrical pittingproof rolling bearing as claimed in claim 4 wherein said bearing rings comprise an outer ring and an inner ring, said insulating film is formed to cover at least one of an outer peripheral surface of said outer ring and an inner peripheral surface of said inner ring, and side faces of at least one of said inner and outer rings.

8. The electrical pittingproof rolling bearing as claimed in claim 6 wherein it is used in a motor of an electric railroad car or in its rotating force transmitting mechanism.

\* \* \* \* \*